Jan. 25, 1966 J. D. THOMAS 3,230,929
DOG URINAL
Filed Aug. 17, 1964

INVENTOR.
JOHN D. THOMAS
BY W. B. Hartman
ATTORNEY

United States Patent Office 3,230,929
Patented Jan. 25, 1966

3,230,929
DOG URINAL
John D. Thomas, 1433 Robbins Ave., Niles, Ohio
Filed Aug. 17, 1964, Ser. No. 390,128
4 Claims. (Cl. 119—1)

This invention relates to convenience accessories for animals and more particularly to a urinal for dogs.

The principal object of the invention is the provision of a urinal comprising a receptacle, a cylindrical perforated member standing thereon and a vertical baffle positioned therein arranged to receive urine directed thereagainst by a dog and guide the same into the receptacle.

A further object of the invention is the provision of a dog urinal that may be easily and inexpensively formed of simple parts capable of simple assembly.

A still further object of the invention is the provision of a urinal for dogs which may be readily disassembled and cleaned and reassembled.

A still further object of the invention is the provision of a device of the class described in which metal and/or plastic components may be used interchangeably.

A still further object of the invention is the provision of a device of the class described which may be formed of inexpensive parts and capable of being sold at retail at relatively low price.

A still further object of the invention is the provision of a dog urinal arranged to receive urine directed thereagainst and confine the same thereto.

The dog urinal disclosed herein comprises a device which may be used for its intended purpose and easily disassembled for cleaning. It is so designed that a pan-like receptacle supports a vertical baffle and a perforated cylindrical member which are in turn held in assembly by a suitable cap member at the uppermost end. These several parts may be formed of metal or plastic and conveniently assembled and disassembled when necessary.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
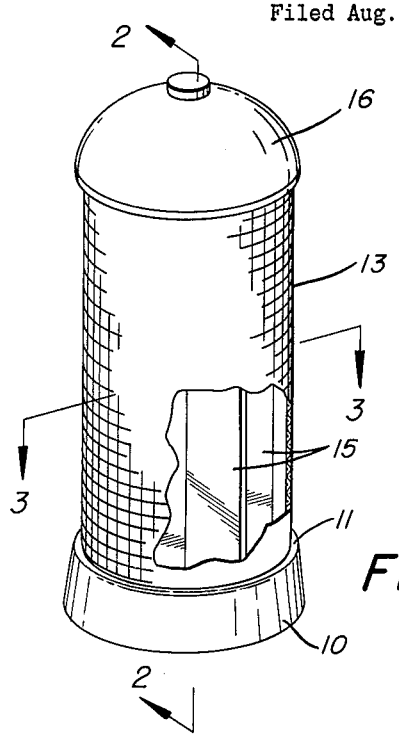
FIGURE 1 is a perspective view of the dog urinal with parts broken away and parts in cross section.
Figure 2:
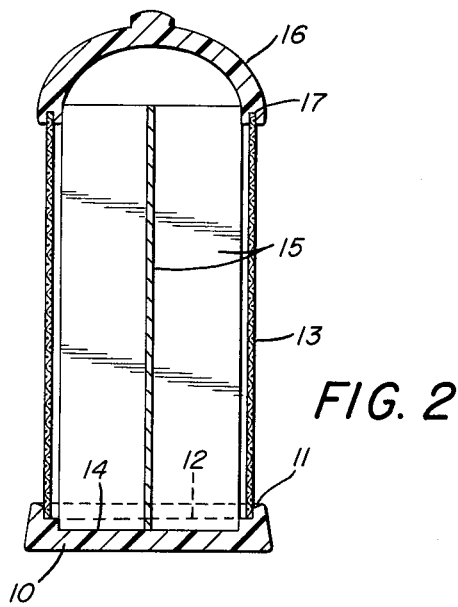
FIGURE 2 is a vertical section on line 2—2 of FIGURE 1.
Figure 3:
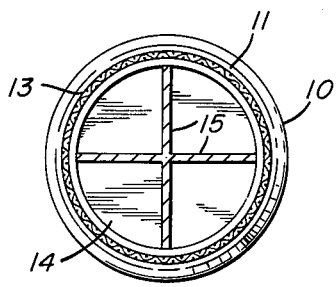
FIGURE 3 is a horizontal section on lines 3—3 of FIGURE 1.

By referring to the drawings and FIGURE 1 in particular, it will be seen that the dog urinal comprises a receptacle 10 which has a relatively wide base portion and an inwardly inclined upper peripheral edge 11. An annular recess 12 formed inwardly of the inwardly inclined peripheral edge 11 serves to receive the lower end of a cylindrical member formed of expanded metal or plastic or metal screen, or the like, and generally indicated by the numeral 13. The lower inner surface of the receptacle 10 is spaced downwardly with respect to the annular shoulder 12 and comprises a receptacle for urine and is illustrated in FIGURE 2 of the drawings by the numeral 14.

It will be seen that the receptacle 10 is thus relatively large and of greater diameter than the diameter of the perforated cylindrical member 13 and that it not only serves as a receptacle but also as a directional guide or flange with respect thereto and as a base supporting the device.

Still referring to FIGURE 1 of the drawings, it will be seen that positioned within the receptacle 10 and resting on the bottom 14 thereof in radially spaced relation with respect to the perforated member 13, there is a vertically standing, cross sectionally X-shaped baffle 15. The X-shaped baffle 15 extends the full height of the device and slightly above the uppermost annular edge of the perforated cylindrical member 13 as best seen in FIGURE 2 of the drawings. It is retained in spaced relation to the perforated cylindrical member 13 by the annular shoulder 12 formed in the receptacle 10 as hereinbefore described and by the inner diameter of a cap 16 which is also provided with a downwardly facing annular groove 17 in which the upper annular edge of the perforated cylindrical member 13 is slidably positioned.

It will thus be seen that the device comprises four parts; the receptacle 10; the perforated cylindrical member 13; the X-shaped vertically standing baffle 15 and the cap 16, and that these parts are so arranged that they may be assembled and retained by their normal frictional engagement with one another and particularly as confined and held by the configuration of the receptacle 10 and its annular shoulder 12 therein.

Those skilled in the art will observe that the perforated cylindrical member may comprise expanded sheet metal suitably coated to prevent rust, or it may comprise slit and expanded sheet plastic, or it may alternately comprise wire screening. The X-shaped vertically standing baffle 15 may comprise two sections of sheet metal engaged at right angles to one another in an egg crate-like construction, or it may comprise an integral molded plastic shape. The receptacle 10 and the cap 16 are preferably molded plastic, although they may comprise stamped metal shapes of appropriate configuration.

It will thus be seen that a dog urinal has been disclosed which may be easily and inexpensively formed, easily assembled and disassembled as needed, and which may be sold at a relatively low price and which will operate effectively for its intended purpose. Having thus described my invention, what I claim is:

1. A dog urinal comprising a pan-like receptacle having a flat base portion and an annular configuration spaced inwardly from its outermost edge, a perforated cylindrical member positioned in said receptacle and standing vertically therein and a vertically standing baffle positioned in said receptacle within the area defined by said annular configuration and means at the uppermost ends of said perforated cylindrical member and baffle securing the same to one another.

2. The dog urinal set forth in claim 1 and wherein the annular configuration comprises an annular horizontal shoulder formed in the rim of the receptacle and with the same defining two vertically and horizontally spaced annular walls and wherein the vertical baffle is X-shaped in cross section and positioned against the innermost one of said vertical walls and wherein the perforated cylindrical member is positioned against the outermost one of said annular walls.

3. The dog urinal set forth in claim 1 and wherein the pan-like receptacle has a rim that includes an upwardly and outwardly inclined flange around its upper peripheral edge extending beyond said perforated cylindrical member.

4. A dog urinal comprising a pan-like receptacle, a vertically standing hollow body member having a plurality of closely spaced openings therein positioned in said receptacle inwardly from the edge thereof and a vertically standing baffle positioned in said receptacle and within the area defined by said hollow body member and spaced with respect thereto and means at the upper end of said hollow body member and said vertically standing baffle forming a partial closure with respect thereto.

References Cited by the Examiner

UNITED STATES PATENTS

| | | | |
|---|---|---|---|
| 1,702,542 | 2/1929 | Hodgson | 4—99 |
| 2,230,861 | 2/1941 | Buehler | 119—1 |
| 2,399,115 | 2/1950 | Shobe | 4—99 X |
| 2,584,656 | 2/1952 | Anderson | 119—1 |
| 2,995,246 | 8/1961 | Van Titelboom | 209—281 |
| 2,997,019 | 8/1961 | Bryson | 119—1 |
| 3,084,666 | 4/1963 | Plaisance | 119—1 |
| 3,143,494 | 8/1964 | Leeman | 209—281 |

SAMUEL KOREN, *Primary Examiner.*

ALDRICH F. MEDBERY, *Examiner.*